US012126966B2

(12) United States Patent
Bervoets

(10) Patent No.: US 12,126,966 B2
(45) Date of Patent: Oct. 22, 2024

(54) MEDICAL DEVICE HAVING AN IMPULSE FORCE-RESISTANT COMPONENT

(71) Applicant: Cochlear Limited, Macquarie University (AU)

(72) Inventor: Wim Bervoets, Wilrijk (BE)

(73) Assignee: Cochlear Limited, Macquarie University (AU)

(*) Notice: Subject to any disclaimer, the term of this patent is extended or adjusted under 35 U.S.C. 154(b) by 1685 days.

(21) Appl. No.: 15/997,105

(22) Filed: Jun. 4, 2018

(65) Prior Publication Data

US 2018/0288539 A1 Oct. 4, 2018

Related U.S. Application Data

(63) Continuation of application No. 14/555,899, filed on Nov. 28, 2014, now abandoned.

(60) Provisional application No. 61/910,227, filed on Nov. 29, 2013.

(51) Int. Cl.

| | |
|---|---|
| ***H04R 25/00*** | (2006.01) |
| ***H04R 1/28*** | (2006.01) |
| ***H04R 17/00*** | (2006.01) |
| *H04R 31/00* | (2006.01) |

(52) U.S. Cl.

CPC ......... *H04R 25/606* (2013.01); *H04R 1/2876* (2013.01); *H04R 17/00* (2013.01); *H04R 31/006* (2013.01); *H04R 2225/67* (2013.01); *H04R 2460/13* (2013.01)

(58) Field of Classification Search

CPC .... H04R 1/2876; H04R 25/456; H04R 25/48; H04R 25/606; H04R 25/608; H04R 25/65; H04R 2460/13; H04R 2225/67

See application file for complete search history.

(56) References Cited

U.S. PATENT DOCUMENTS

| | | | | |
|---|---|---|---|---|
| 2,808,522 A * | 10/1957 | Dranetz | G01P 15/0922 | 310/326 |
| 3,048,668 A * | 8/1962 | Weiss | H04R 25/60 | 381/338 |
| 2006/0045298 A1* | 3/2006 | Westerkull | H04R 9/025 | 381/326 |
| 2007/0053536 A1* | 3/2007 | Westerkull | H04R 25/606 | 381/326 |
| 2008/0112584 A1* | 5/2008 | Karamuk | H04R 25/456 | 381/324 |
| 2010/0145135 A1* | 6/2010 | Ball | H04R 25/606 | 600/25 |
| 2010/0298626 A1* | 11/2010 | Andersson | H04R 25/606 | 600/25 |

* cited by examiner

*Primary Examiner* — Carrie R Dorna

(74) *Attorney, Agent, or Firm* — Pilloff Passino & Cosenza LLP; Martin J. Cosenza

(57) ABSTRACT

A vibrator including a housing, a transducer mounted in the housing such that there is a gap between the housing and transducer; and an impulse force damper that substantially fills the gap. Such a damper includes: a first layer in contact with the housing; and a second layer in contact with the transducer and the first layer; wherein substantially no adhesion is exhibited between the first and second layers or between at least one of the first and second layers and at least one of the housing and the transducer.

33 Claims, 11 Drawing Sheets

MEDICAL DEVICE HAVING AN IMPULSE FORCE-RESISTANT COMPONENT

CROSS-REFERENCE TO RELATED APPLICATIONS

The present application is a Continuation application of U.S. patent application Ser. No. 14/555,899, filed Nov. 28, 2014, which claims priority to U.S. Provisional Patent Application No. 61/910,227, filed on Nov. 29, 2013, naming Wim Bervoets as an inventor, the contents of each application being incorporated herein in their entirety.

BACKGROUND

Field of the Disclosure

The present disclosure relates generally to medical devices, and more particularly, to medical devices having an impulse-force-resistant component.

Related Art

Hearing loss, which may be due to many different causes, is generally of two types, conductive and/or sensorineural. Conductive hearing loss occurs when the normal mechanical pathways of the outer and/or middle ear are impeded, for example, by damage to the ossicular chain or ear canal. Sensorineural hearing loss occurs when there is damage to the inner ear, or to the nerve pathways from the inner ear to the brain.

Individuals suffering from conductive hearing loss typically receive an auditory prosthesis that provides acoustic stimulation, e.g., a hearing aid. Typically, a hearing aid is positioned in the ear canal or on the outer ear to amplify received sound. This amplified sound is delivered to the cochlea through the normal middle ear mechanisms resulting in the increased perception of sound by the recipient.

Individuals who suffer from conductive hearing loss typically have some form of residual hearing because the cochlea hair cells are often undamaged. As a result, individuals suffering from conductive hearing loss might receive an auditory prosthesis that provides mechanical stimulation to cause a hearing percept. Such prostheses include, for example, bone conduction devices and middle ear implants.

Auditory prostheses such as bone conduction devices function by converting a received sound signal into a mechanical vibration representative of the received sound. An electromechanical transducer can be used for such conversion. The vibrations are delivered or applied to the skull (cranium, mandible or teeth), and travel through the bone structure of the skull. This skull vibration results in relative motion of the cochlea and cochlea fluid or perilymph, thereby stimulating the cochlea hair cells to cause a hearing percept.

SUMMARY

In one aspect of the disclosed technology, a vibrator is described. The vibrator comprises: a housing; a transducer positioned within the housing such that there is a gap between the transducer and housing; and an impulse force damper, disposed in the gap between the housing and the transducer, configured to mechanically isolate the transducer and the housing from each other, and to minimize impulse forces applied to the transducer.

In another aspect of the disclosed technology, a method for making an impulse-force-resistant vibrator is described. The method comprises: providing a vibrator including a transducer mounted in a housing such that a gap exists between the transducer and the housing; forming a first layer on a portion of one of the housing and the transducer; and substantially filling the gap between the first layer and the other of the housing and the transducer with a second layer; and wherein substantially no adhesion is exhibited between the second layer and one of the housing and the transducer.

In a third aspect of the disclosed technology, a method of damping an impulse force to which a vibrator for an auditory prosthesis is susceptible, the vibrator including a housing, a transducer mounted in the housing and a multilayer damper disposed between the housing and the transducer, is described. The method comprises: compressing the damper in response to the impulse force, the compressing including: deforming at least one layer of the damper so as to dissipate energy of the impulse force; and slipping of at least one layer with respect to one of the housing and the transducer, due to there being substantially no adhesion between the at least one layer between and one of the housing and the transducer. The damper comprises at least one layer that provides a lack of adhesion between itself and one of the housing and the transducer in order to achieve the slipping.

In another exemplary embodiment, there is a method of making an impulse-force-resistant vibrator, the method comprising providing a vibrator including a transducer mounted in a housing such that a gap exists between the transducer and the housing, forming a first layer on a portion of one of the housing and the transducer, and substantially filling the gap between the first layer and the other of the housing and the transducer with a second layer, and wherein substantially no adhesion is exhibited between, the first and second layers, or at least one of the first and second layers and at least one of the housing and transducer.

In another exemplary embodiment of any one or more of the methods detailed above or below, the forming includes coating the portion of one of the housing and the transducer with an elastomer substantially conforming to manufacturing tolerances of the surface of the one of the housing and the transducer, and the substantially filling includes injecting an uncured or semi-cured elastic material into the gap via at least one of one or more openings or more ducts in a mass component of the transducer. In another exemplary embodiment of any one or more of the methods detailed above or below, the method(s) further include curing the elastic material. In another exemplary embodiment of any one or more of the methods detailed above or below, the forming includes depositing the first layer onto the portion of one of the housing and the transducer so as to thereby substantially conform to manufacturing tolerances thereof, and the substantially filling includes flowing the second layer so as to thereby substantially conform to manufacturing tolerances of the other of the housing and the transducer.

In another exemplary embodiment of any one or more of the methods detailed above or below, the forming of the first layer and the substantially filling the gap with the second layer impose substantially no static preload on the transducer. In another exemplary embodiment of any one or more of the methods detailed above or below, the vibrator is configured for incorporation in a bone conduction device.

BRIEF DESCRIPTION OF THE DRAWINGS

Exemplary embodiments of the present technology are best understood from the following detailed description when read in conjunction with the accompanying drawings. The accompanying drawings, which are incorporated herein and form part of the specification, illustrate exemplary embodiments of the present disclosure and, together with the description, serve to explain principles, aspects and features of the present disclosure, and further serve to enable a person skilled in the relevant art to make and use the present technology. It is emphasized that, according to common practice, the various features of the drawings are not to scale. On the contrary, the dimensions of the various features are arbitrarily expanded or reduced for clarity. Common numerical references represent like features/elements. Embodiments of the present technology are described below with reference to the attached drawings, in which.

DETAILED DESCRIPTION

Figure 1A:
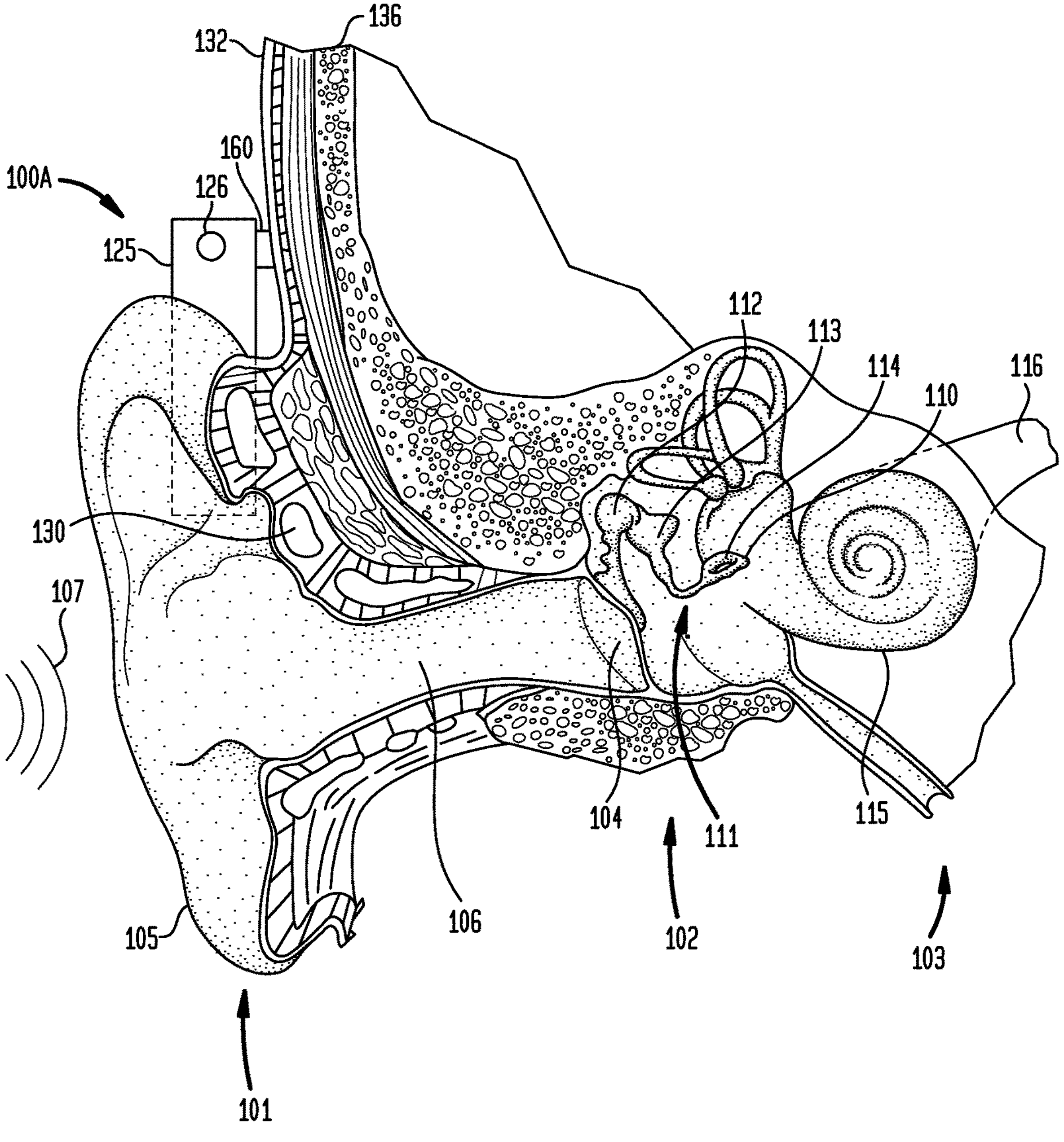
FIG. 1A is a perspective view of an exemplary auditory prosthesis, namely a percutaneous bone conduction device, in which embodiments of the present technology may be implemented.

Embodiments of the present technology are generally directed to a medical device having an impact force-resistant component. In some embodiments, the component is a vibrator. The component has a housing in which a functional element is disposed. There is a gap between the housing and functional element, and the functional element may have some freedom of movement inside the housing. An impulse force damper is disposed in, and in at least some exemplary embodiments, fills, the gap between the functional element and the housing so as to substantially absorb impulse forces thereby minimizing potential damage to the functional element. Impulse forces may be created, for example, by rapid acceleration or deceleration of the component and/or by physical contact of the functional element with the component housing. Impulse forces can be generated by external sources, such as, for example, an impulse force applied to an external surface of the housing of the medical device or an impulse force applied to the recipient's head. Impulse forces can also originate from internal sources, such as, for example, movement of the functional component within the housing, or inertia of a moveable portion of the functional component. In those applications in which, when operating, the functional element translates, rotates, changes dimensions, or otherwise moves, the impulse force damper substantially mechanically isolates the functional element from the housing nor does it load the functional element so as to minimize changes in the performance of the functional element due to the presence of the impulse force damper.

In specific disclosed embodiments, the impulse force damper includes two layers of material: an isolation layer adjacent the functional element or housing, and a force dissipation layer disposed between the isolation layer and the other of the functional element or housing. The isolation layer minimizes adhesion of the force dissipation layer to the adjacent element or housing on the opposing side of the isolation layer. This prevents the housing from altering the physical movement of the functional element during its operation. The isolation layer prevents the housing from altering the physical movement functional element during operation. In other words, the isolation layer mechanically isolates the housing from the functional element so that they do not become one element due to their respective connections to the impulse force damper. The force dissipation layer absorbs an impulse force by deforming to absorb the energy in the functional element as it travels toward the housing. For example, in some embodiments the force dissipation layer is elastic. As such, deformation of this layer results in a change in the dimensions of the layer to accommodate the closing gap between the functional element and housing. That is, the force dissipation layer deforms such that a portion of the force dissipation layer moves to/from other regions of the gap or to/from the gap as the dimensions of the gap change.

In some disclosed embodiments, the medical device is an auditory prosthesis, such as a bone conduction device or a middle ear implant, both of which convert received sound signals into mechanical vibrational forces for delivery to a recipient of the prosthesis. One component of such auditory prostheses is commonly referred to as a vibrator. Disposed in the housing of the vibrator are a variety of functional elements one of which is a transducer. The transducer may be any transducer now or later developed, such as an electro-acoustic transducer or an electro-mechanical transducer. In some embodiments, the transducer comprises a piezoelectric element. The transducer typically also includes one or more mass components, and a coupling configured to attach the vibrator to another component or the recipient. Movement of the piezoelectric element induces the mass components to vibrate, which in turn generates mechanical forces. The coupling transfers mechanical forces generated by the transducer to the recipient.

In certain embodiments, the impulse force damper includes a damping layer that absorbs impulse forces and an isolation layer that creates slip between itself and one of the housing or the transducer. In some embodiments, the isolation layer comprises silicone (i.e., a silicone layer). The isolation layer allows slip between itself and one of the housing or transducer, depending on the position of the isolation layer, so as to mechanically isolate the transducer from the housing. In some disclosed embodiments, the impulse force damper provides isolation between the housing and transducer including a piezoelectric element so as to protect the piezoelectric element against impulse forces while maintaining the transducer output. In exemplary embodiments, the impulse force damper protects the piezoelectric element against external and internal impulse forces without altering a frequency response of the transducer. According to these embodiments, the impulse force damper does not affect the output curve or resonance frequencies of the transducer.

Vibrators and auditory prostheses having impulse force dampers in accordance with certain embodiments of the present technology may have the utilitarian feature, in at least some embodiments, of delivering initial resonance frequency location, or a resonance frequency location substantially the same as the initial resonance frequency location, and output force levels (OFLs) of the designed configurations without being adversely influenced by impulse shock forces. Some embodiments of the impulse force damper protects the transducer from impulse forces without substantially altering the transfer function of the transducer.

Figure 1B:
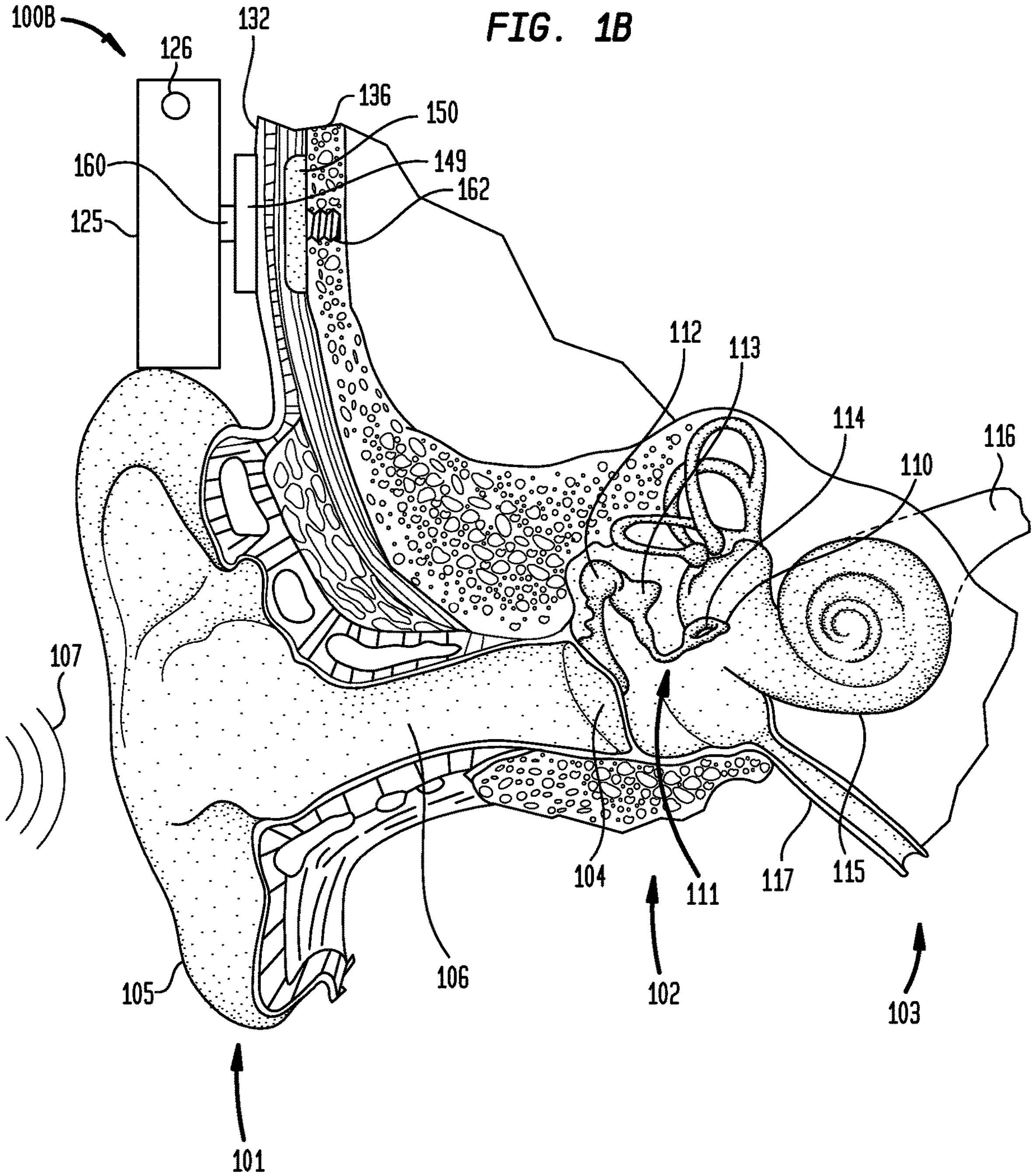
FIG. 1B is a perspective view of an exemplary auditory prosthesis, namely a transcutaneous bone conduction device, in which embodiments of the present technology may be implemented.
Figure 1C:
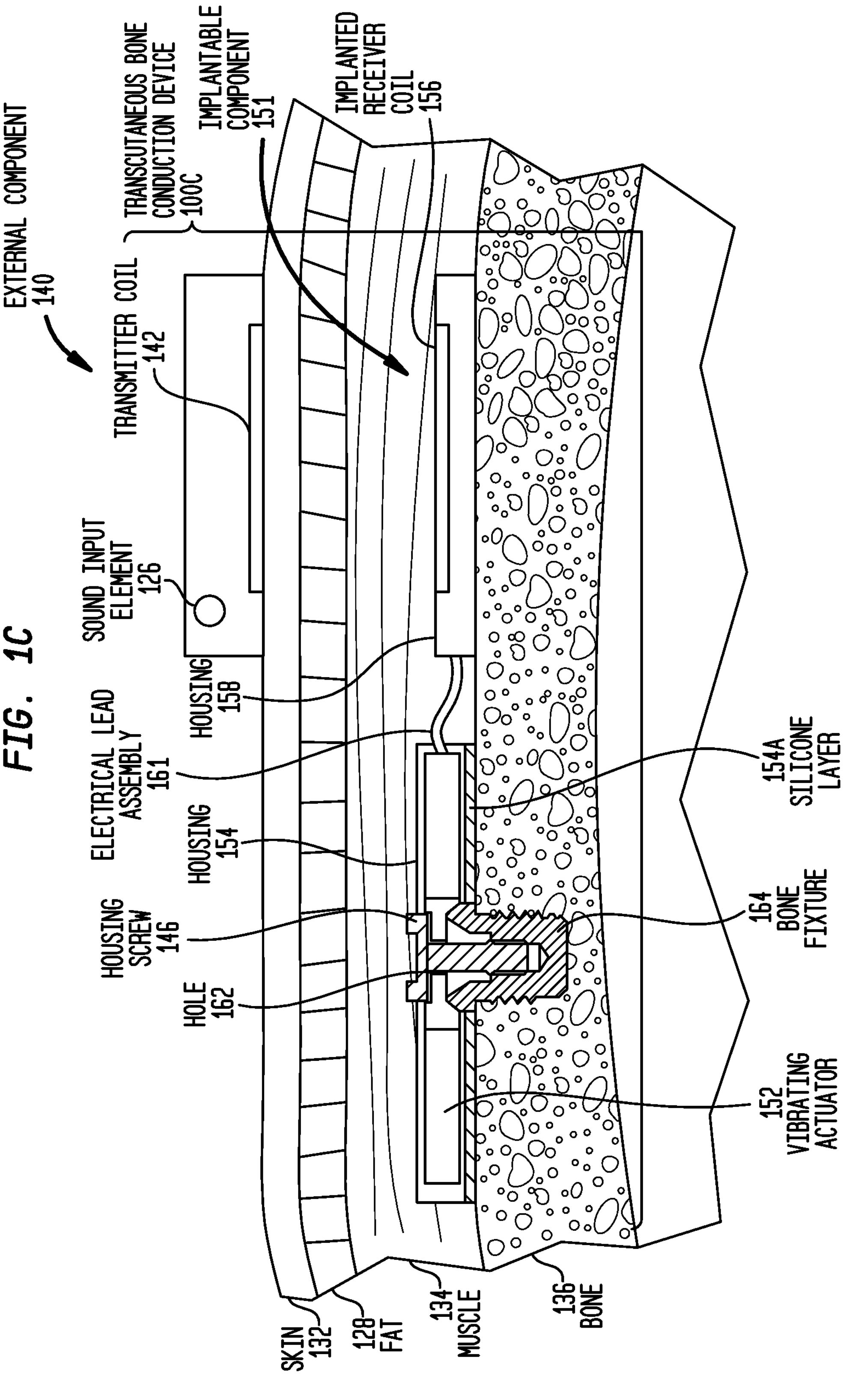
FIG. 1C is a schematic diagram illustrating an exemplary active transcutaneous bone conduction device in which embodiments of the present technology may be implemented.

As noted above, bone conduction devices have been found suitable to treat a variety of types of hearing loss and may be suitable for individuals who cannot derive sufficient benefit from other types of auditory prostheses. FIGS. 1A and 1B are perspective views of bone conduction devices 100 in which embodiments of the present technology may be implemented. FIG. 1C is a schematic diagram illustrating an active transcutaneous bone conduction device 100C in which embodiments of the disclosed technology may be implemented. As shown in FIGS. 1A and 1B, the recipient has an outer ear 101, a middle ear 102 and an inner ear 103.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window 110 through three bones of middle ear 102, collectively referred to as the ossicles 111 and comprising the malleus 112, the incus 113 and the stapes 114. Bones 112, 113 and 114 of middle ear 102 serve to filter and amplify acoustic wave 107, causing oval window 110 to articulate, or vibrate. Such vibration sets up waves of fluid motion within cochlea 115. Such fluid motion, in turn, activates tiny hair cells (not shown) that line the inside of cochlea 115. Activation of the hair cells causes appropriate nerve impulses to be transferred through the spiral ganglion cells and auditory nerve 116 to the brain (not shown), where they are perceived as sound.

FIG. 1A also illustrates the positioning of a bone conduction device 100A relative to outer ear 101, middle ear 102 and inner ear 103 of a recipient of the device. As shown, exemplary bone conduction device 100A is a percutaneous bone conduction device positioned behind outer ear 101 of the recipient. In the embodiment illustrated in FIG. 1A, bone conduction device 100A comprises a vibrator 125 and a sound input element 126 positioned in, on or coupled to vibrator 125. Sound input element 126 is configured to receive sound signals and may comprise, for example, a microphone, telecoil, etc. Sound input element 126 may also be a component that receives an electronic signal indicative of sound, such as, for example, from an external audio device. Typically, vibrator 125 comprises a sound processor, a transducer, and various other electronic circuits/components. Sound signals received by sound input element 126 are converted to electrical signals which are processed by the sound processor to generate drive signals which cause the actuator to vibrate.

Bone conduction device 100A further includes a vibratory coupling 160 that extends from the housing of vibrator 125 to releasably connect to a percutaneous abutment fixed to the recipient's skull bone 136. For example, with reference to the embodiment shown in FIG. 1A, coupling 160 may be connected to a percutaneous abutment implanted under the skin 132 of the recipient, within muscle tissue 134 and/or fat tissue 128. In the specific embodiment of FIG. 1A, coupling 160 can be attached to an anchor system implanted in the recipient. Such an anchor system can comprise a percutaneous abutment fixed to the recipient's skull bone 136. The abutment can extend from bone 136 through muscle 134, fat 128 and skin 132 so that coupling 160 may be attached thereto. Such a percutaneous abutment provides an attachment location for coupling 160 that facilitates efficient transmission of mechanical vibrational forces generated by percutaneous bone conduction device 100A.

FIG. 1B is a perspective view of another bone conduction device 100B in which embodiments of the present technology may be implemented. Bone conduction device 100B is a transcutaneous bone conduction device comprising external and implantable components. Bone conduction device 100B includes a vibrator 125 and a sound input element 126 to receive sound signals. In exemplary embodiments, sound input element 126 is located, for example, on or in vibrator 125, or it may be subcutaneously implanted in the recipient.

In the arrangement illustrated in FIG. 1B, bone conduction device 100B is a passive transcutaneous bone conduction device due to all active components being external to the recipient. In such an arrangement, vibrator 125 is located behind outer ear 101, and the vibrations are transcutaneously transferred to the skull via a pair of magnetic plates 149, 150. External magnetic plate 149 is connected to vibrator 125 via coupling 160. During normal operations, external magnetic plate 149 vibrates with the actuator. Such vibrations are transcutaneously transferred to internal magnetic plate 150 which is magnetically coupled to external magnetic plate 149. The vibrations are transferred to skull 136 via bone fixture 162.

It is to be appreciated that transcutaneous bone conduction device 100B may be an active transcutaneous bone conduction device in which at least one active component is implanted in the recipient. In one such arrangement, a signal receiver and/or various other electronic circuits/devices are implantable. An example of such an active transcutaneous bone conduction device is described below with reference to FIG. 1C. It is also to be appreciated that embodiments of the present technology may be implemented with other types of auditory prostheses including implantable middle-ear mechanical stimulation devices (not shown). Typically, implantable middle-ear mechanical stimulation devices are implantable within middle ear 102 and are configured to deliver mechanical forces to ossicles 111 or cochlea 115. Such mechanical forces directly or indirectly cause fluid motion in the cochlea which, in turn, cause the generation of nerve impulses which travel through the spiral ganglion cells and auditory nerve 116 to the brain (not shown), where they are perceived as sound.

FIG. 1C depicts an exemplary embodiment of a transcutaneous bone conduction device 100C according to another embodiment of the present technology that includes an external device 140 and an implantable component 151. The transcutaneous bone conduction device 100C of FIG. 1C is an active transcutaneous bone conduction device in that the vibrating actuator 152 is located in the implantable component 151. Specifically, a vibratory element in the form of vibrating actuator 152 is located in housing 154 of the implantable component 151. In exemplary embodiments, much like vibrators 300A-D described below with respect to FIGS. 3A-3D, the vibrating actuator 152 is a device that converts electrical signals into vibration.

External component 140 includes a sound input element 126 that converts sound into electrical signals. Specifically, the transcutaneous bone conduction device 100C provides these electrical signals to vibrating actuator 152, or to a sound processor (not shown) that processes the electrical signals, and then provides those processed signals to the implantable component 151 through the skin 132 of the recipient via a magnetic inductance link. In this regard, a transmitter coil 142 of the external component 140 transmits these signals to implanted receiver coil 156 located in housing 158 of the implantable component 151. Components (not shown) in the housing 158, such as, for example, a signal generator or an implanted sound processor, then generate electrical signals to be delivered to vibrating actuator 152 via electrical lead assembly 161. The vibrating actuator 152 converts the electrical signals into vibrations.

The vibrating actuator 152 is mechanically coupled to the housing 154. Housing 154 and vibrating actuator 152 collectively form a vibrating element. The housing 154 is substantially rigidly attached to bone fixture 164. In this regard, housing 154 includes through hole 162 that is contoured to the outer contours of the bone fixture 164. Housing screw 146 is used to secure housing 154 to bone fixture 164. The portions of housing screw 146 that interface with the bone fixture 164 substantially correspond to the abutment screw detailed below, thus permitting housing screw 146 to readily fit into an existing bone fixture used in a percutaneous bone conduction device (or an existing passive bone conduction device such as that detailed above). In an exemplary embodiment, housing screw 146 is configured so that the same tools and procedures that are used to install and/or remove an abutment screw from bone fixture 164 can be used to install and/or remove housing screw 146 from the bone fixture 164.

Figure 2A:
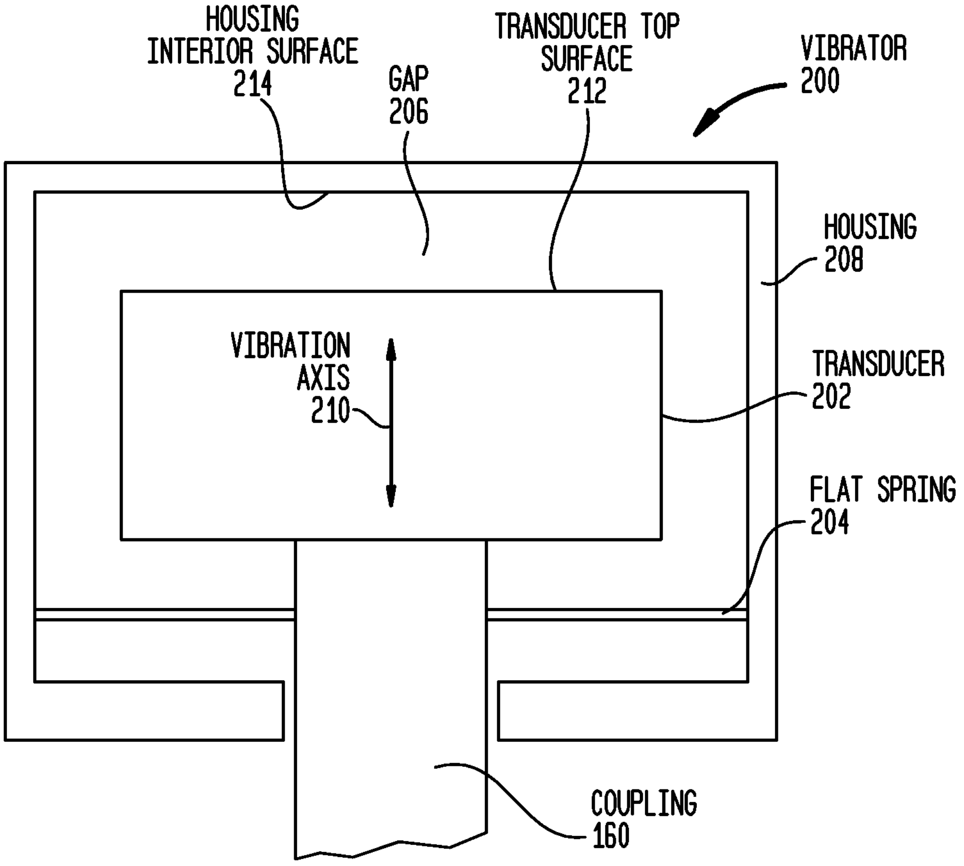
FIG. 2A is a schematic cross-sectional simplified view of an exemplary vibrator that may be implemented in the auditory prostheses of FIGS. 1A-1C.

FIG. 2A is a simplified block diagram of an exemplary auditory prosthesis vibrator 200 representing, for example, vibrators 125 described above with reference to FIGS. 1A and 1B and vibrating actuator 152 described above with reference to FIG. 1C. Vibrator 200 (or vibrating element, "vibrator" herein) includes a housing 208, a vibrating transducer 202 ("transducer" herein, sometimes referred to as a transducer module), a coupling apparatus 160 that is mechanically connected to vibrating transducer 202 and extends from housing 208. Transducer 202 and coupling apparatus 160 are suspended in housing 208 by flat spring 204. In an exemplary embodiment, flat spring 204 is connected to coupling apparatus 160, and transducer 202 is supported by coupling apparatus 160. The configuration of the opposing distal end of coupling apparatus 160 varies depending on whether vibrator 202 is a component of an active transcutaneous bone conduction device, such as the devices shown in FIGS. 3A-3D, or passive transcutaneous bone conduction device.

Figure 2B:
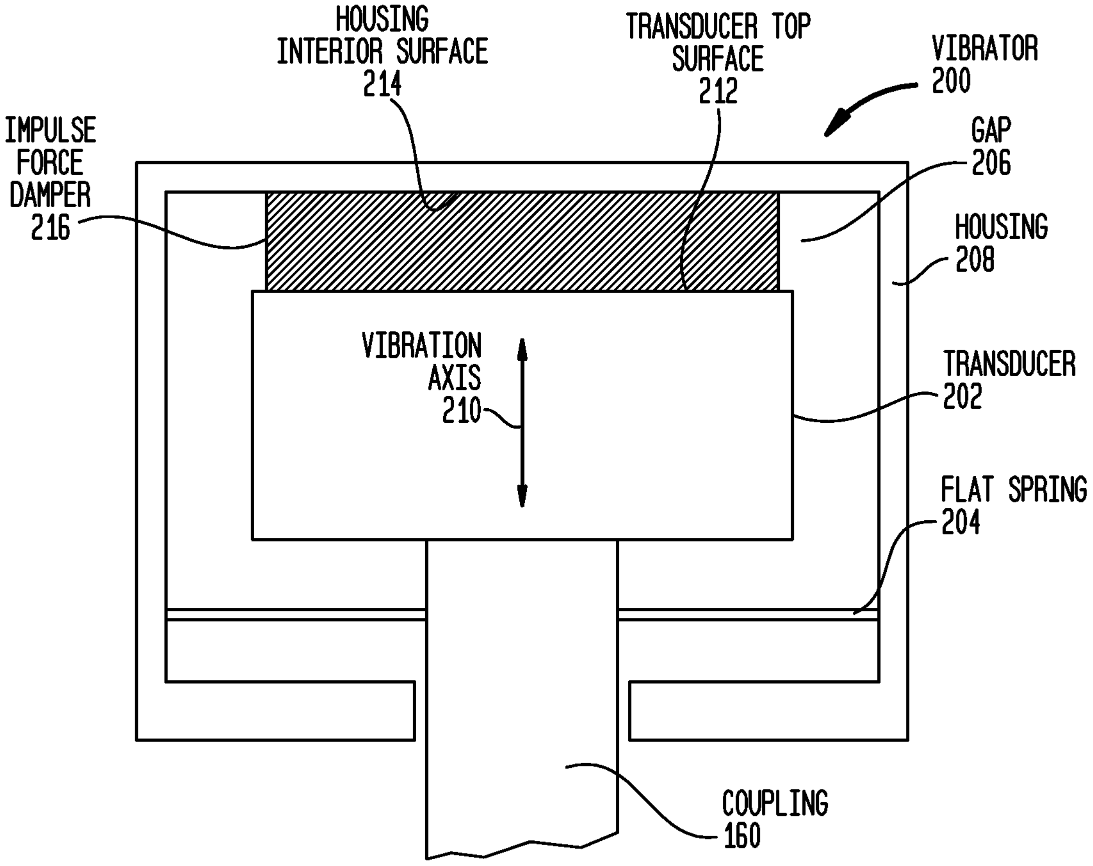
FIG. 2B is a schematic cross-sectional simplified view of an exemplary vibrator having an impulse force damper that may be implemented in the auditory prostheses of FIGS. 1A-1C.

As shown in FIG. 2A, there is void, space or gap ("gap" 206 herein) between transducer 202 and housing 208 resulting from the suspension of transducer 202 by flat spring 204 inside housing 208. At times vibrator 200 may be subjected to a sudden increase or decrease in velocity resulting from, for example, a shock or blow to the component and/or to the recipient. When this occurs, transducer 202 may experience rapid acceleration or deceleration and/or may contact interior surface 214 of housing 208 with a force referred to herein as an impulse force. Such an impulse force may be sufficient to damage the transducer. Due to the configuration of vibrator 200, impulse forces which are more likely to cause damage to transducer 202 are those forces which have a vector component that is parallel to vibration axis 210 since transducer 202 is provided freedom of movement along axis 210. That is, an impulse force may be applied to top surface 212 of transducer 202 when transducer 202 travels through gap 206 to, perhaps, strike housing interior surface 214. FIG. 2B depicts the same simplified block diagram of auditory prosthesis vibrator 200 as shown in FIG. 2A. However, in FIG. 2B, vibrator 200 includes an impulse force damper 216 disposed between transducer top surface 212 and housing interior surface 214. Impulse force damper 216, in at least some exemplary embodiments, fills gap 206, as shown in FIG. 2B. Impulse force damper 216 does not adhere to at least one of the adjacent transducer and housing interior surfaces 212 and 214, respectively. Such mechanical isolation prevents housing 208 from interfering with the operational performance of transducer 202. Impulse force damper 216 substantially absorbs impulse forces created by physical movement of transducer 202 along vibration axis 210.

FIGS. 3A-3D are block diagrams of a vibrator 200, referred to herein as vibrators 300A-300D, respectively. Various embodiments of impulse force damper 216 are implemented in vibrators 300A-300D, which are described with reference to the bone conduction devices illustrated in FIGS. 1A-1C. For brevity, only differences presented in FIGS. 3A-3D are described below.

Figure 3A:
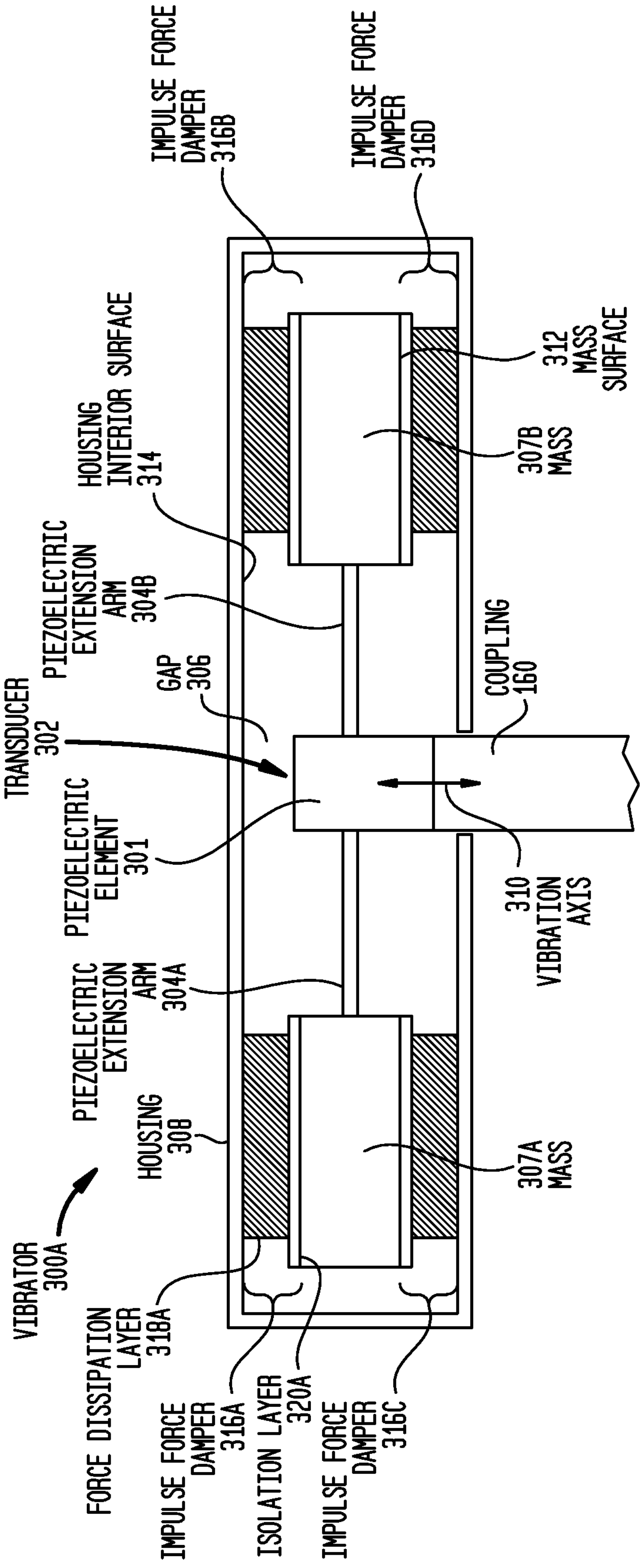
FIG. 3A is a schematic side view of a vibrator having impulse force dampers and dual counter-masses, in accordance with exemplary embodiments of the present technology.

Referring to FIG. 3A, vibrator 300A has a transducer 302 comprised of a piezoelectric element 301 attached to two masses 307A, 307B, by extension arms 304A, 304B, respectively. As shown in the exemplary embodiments of FIGS. 3A-3D, the piezoelectric element 301 can include piezoelectric extension arms 304A and 304B (i.e., extension arms 304A, 304B are piezoelectric elements and function collectively, with the piezoelectric element 301, as a single piezoelectric element). A piezoelectric element converts an electrical signal applied thereto into a mechanical deformation (i.e., expansion or contraction) of the piezoelectric element. The extent of deformation of the piezoelectric element in response to a given applied electrical signal depends on the material properties of the element, the orientation of the electric field with respect to the polarization direction of the element, the geometry of the element, etc., as is well known in the art.

Each mass 307 is formed of material such as tungsten, tungsten alloy, brass, etc., and may have a variety of shapes. Additionally, the shape, size, configuration, orientation, etc., of each mass 307 may be selected to optimize the transmission of the mechanical force from piezoelectric transducer 302 to the recipient's skull and to optimize the frequency response of the transducer. In certain embodiments, the size and shape of each mass 307 is chosen to ensure that there sufficient mechanical force is generated and to optimize the response of the transducer 302.

In specific embodiments, masses 307 have a weight between approximately 1 g and approximately 50 g. Furthermore, the material forming masses 307 may have a density, e.g., between approximately 2000 kg/m3 and approximately 22000 kg/m3. As shown, piezoelectric element 301 is also attached to coupling 160 which is utilized to transfer the mechanical force generated by the transducer to the recipient's skull.

Transducer 302 is suspended in housing 125 such that there is a gap 306 between housing 308 and transducer 302. That is, housing interior surface 314 and the surface 312 of the masses are in spaced juxtaposition to define a gap 306A-306D. As noted, gaps 306 allows for the vibration of transducer 302 in vibration axis 310. In the embodiment illustrated in FIG. 3A, impulse force dampers 316A-D are disposed between housing interior surface 314 and the adjacent surfaces 312 of masses 307 to substantially fill their respective gap 306 between housing interior surface 314 and juxtaposed mass surface 312. In at least some embodiments, impulse force dampers 316 prevent the rapid acceleration and deceleration of masses 307. Such movement may cause a significant impulse force to be applied to piezoelectric element 301 given the size of masses 307 and length of extension arms 304. For ease of description, impulse force damper 316A will be described below. With the exceptions noted below, the description of impulse force damper 316A applies to impulse force dampers 316B-D.

In certain embodiments, damper 316A includes at least two layers, an elastic force dissipation layer 318A and an isolation layer 320A. Force dissipation layer 318A substantially dissipates the kinetic energy in the moving mass 307A thereby preventing the mass from experiencing sudden acceleration or deceleration which would cause piezoelectric element 301 from experiencing a potentially damaging impulse force. Isolation layer 320A is disposed between force dissipation layer 318A and transducer mass 307A. In some embodiments, isolation layer 320A is formed from a silicone elastomer. In the same or other embodiments, force dissipation layer 318A is substantially elastic shock absorbing layer formed of a soft and elastic material such as a cured liquid silicone rubber material. As noted, force dissipation layer 318A deforms as mass 307A travels toward the housing. This deformation absorbs energy, causing a decrease in the rate at which the transducer travels and limits the amount of force transmitted to the piezoelectric elements or the mass elements. In some embodiments, frequency response and output of vibrator 300A is maintained because housing 308 and mass 307 are decoupled and prevented from adhering to each other. For example, as shown in the exemplary embodiment of FIG. 3A, the isolation layer 320A disposed between the force dissipation layer 318A and the housing interior surface 314 decouples mass 307A from housing 308 and prevents mass 307A from adhering to housing 308.

Force dissipation layer 318A is formed of material(s) configured to exhibit sufficiently low stiffness and/or sufficient elasticity so as to flex or deform in response to a compressive force caused by transducer mass 307A traveling toward housing surface 314, thereby reducing the rate at which gap 306A decreases. Elastic materials strain when stretched and return to their original state relatively quickly once the stress is removed. In certain embodiments, force dissipation layer 318A is an elastic material made from one or more of a soft silicone type material, a foam material, and a rubber material.

Thus, exemplary force damper 316A is configured to achieve impulse force dissipation through a combination of deformation of an elastic material exhibiting sufficiently low stiffness and shear damping via substantial gross slip along the interface where a surface of damper 316A abuts an adjacent layer or surface. In one embodiment, impulse force dissipation layer 318A comprises a cured liquid silicone rubber.

Isolation layer 320A is disposed between force dissipation layer 318A and mass 307A to prevent adhesion of the force dissipation layer to mass surface 312. Isolation layer 320A can be configured to achieve this by preventing adhesion between itself and mass 307A. In some embodiments, the force dissipation and isolation layers are configured to exhibit substantially no adhesion between each other.

Impulse force damper 316A comprises a relatively thin isolation layer 320A and a relatively thick impulse force dissipation layer 318A. It should be appreciated that the absolute and relative thicknesses of force dissipation layer 318A and isolation layer 320A depicted in FIG. 3A is for ease of illustration, and is not intended to illustrate specific or relative dimensions. In certain embodiments, isolation layer 320A has a thickness between 0.1 mm and 0.6 mm and impulse force damper 316A has an overall thickness of between 0.2 mm and 10 mm. Force dissipation layer 318A can have a thickness of between 0.4 mm to 0.9 mm. Other size ranges, larger or smaller, than the exemplary size ranges described herein, are possible depending on the dimensions of the vibrator and the gap. In alternative embodiments, layers 320A and 318A have substantially the same thickness.

In some embodiments isolation layer 320 is a relatively thin film or sheet arranged on either side of mass components 307 and impulse force dissipation layer 318 is a relatively thicker shock absorbing/damping material arranged between isolation layer 320 and housing 125. In certain embodiments, the isolation layer 320 can comprise a cured silicone elastomer having a thickness of less than about 70 micrometers (μm). The force dissipation layer 318 is configured to deform laterally with respect to a surface of the transducer (such as a surface 312 of mass component 307) and an opposing surface 314 of housing 308 in order to dissipate an impulse force applied to the vibrator. In embodiments, impulse force dissipation layer 318 can comprise a cured silicone rubber.

In certain embodiments, isolation layer 320A comprises a material having one of more of the following: an American Society for Testing and Materials (ASTM) technical standard D2240 Durometer Type A scale value of about 50; a Tensile Strength of about 1450 psi (pounds per square inch); an Elongation of about 1000%; a Tear Strength (Die B) of about 250 ppi (pounds per inch); a Stress @200% Strain of about 300 psi; and a Specific Gravity of about 1.16. A commercially available example of such a material is Model No MED 49-01 (a type of silicone elastomer) manufactured by NUSIL® Technology, LLC, in a cured state, which is available in sheets of about 0.002 inches thick.

In certain embodiments, impulse force dissipation layer 318A comprises a material having one of more of the following: an ASTM technical standard D2240 Durometer Type OO scale value less than or equal to about 40; a Tensile Strength of about 325 psi; an Elongation of about 1075%; a Tear Strength of about 60 ppi; a Stress @100% Strain of about 10 psi; a Stress @300% Strain of about 30 psi; and a Stress @500% Strain of about 65 psi. A commercially available example of such a material is Model No. MED 82-50 1 0-02 (a type of liquid silicone rubber) manufactured by NUSIL® Technology, LLC, in a cured state.

Thus, in the embodiment of FIG. 3A, force dissipation layer 318A is configured to exhibit non-negligible adhesion to housing surface 314 and substantially no adhesion to isolation layer 320A. This enables impulse force damper 316A to dissipate energy through a combination of deformation and shear damping along the interface between with isolation layer 320A. Shear damping refers to the lateral sliding or slipping of the layers 318A and 320A, which is possible due to lack of adhesion between the layers.

In certain embodiments, isolation layer 320A is configured to exhibit substantially no adhesion with respect to an adjacent surface of impulse force dissipation layer 318A so as to allow gross slip via at least some shear damping along one or more of an interface between: dissipation layer 318A and isolation layer 320A. For example, isolation layer 320A can be configured to act as an anti-adhesive or lubricant with respect to dissipation layer 318A. Shear damping along an interface between dissipation layer 318A and isolation layer 320A can be explained by considering the behavior of two adjacent surfaces that are in contact with each other. A clamping force may exist between these two surfaces. Such a clamping force can result from externally applied loads, or from a mating or press fit that produces an interface common to the two parts. If an additional exciting force is gradually imposed, the two parts may initially react as a single elastic body such that there is shear on the interface, but not enough to produce relative slip at any point. As the force increases in magnitude to the extent that the force constitutes application of an impulse force, the resulting shearing traction at some places on the interface can exceed the limiting value permitted by the friction characteristics of the two mating surfaces (e.g., a surface of isolation layer 320A and an adjacent surface dissipation layer 318A). According to the embodiments described herein, isolation layer 320A of impulse force damper 316A exhibits substantially no adhesion to dissipation layer 318A such that the limiting value and shearing traction are sufficiently low so as to allow gross slip to occur along the interface where dissipation layer 318A and isolation layer 320A mate with each other. In regions where a surface of impulse force damper 316A mates with mass component 307A, 307B or housing 308, microscopic slip of adjacent points on opposite sides of the interface can occur. In an alternative embodiment, there is slip between the two layers of the impulse force damper 316A. According to this embodiment, there is slip between force dissipation layer 318A and isolation layer 320A. In an exemplary embodiment, the slipped region extends substantially over the entire interface between layers 318A and 320A so that gross slip can occur. In some embodiments, slip occurs between isolation layer 320A and one of the interior housing surface 314 or the mass 307 depending on which is in contact with isolation layer 320A. Subsequent application of a tangential force can produce slip over a portion of the interface even if a peak tangential force is not great enough to affect gross slip or sliding along the interface. In certain embodiments, isolation layer 320A can comprise a relatively thin (with respect to layer 318A) foil, sheet, or film of silicone elastomer coating a surface of a portion of a transducer, such as a region or surface of mass component 307. For example, isolation layer 320A can be a cured silicone elastomer applied to mass components 307 so as to allow gross slip between impulse force dissipation layer 318A and isolation layer 320A. In some embodiments, gross slip occurs between the isolation layer 320A and the housing 308 or mass 307, depending on which one the isolation layer 320A is in contact with. In an alternative embodiment, slip occurs between force dissipation layer 318A and the isolation layer 320A.

Figure 3B:
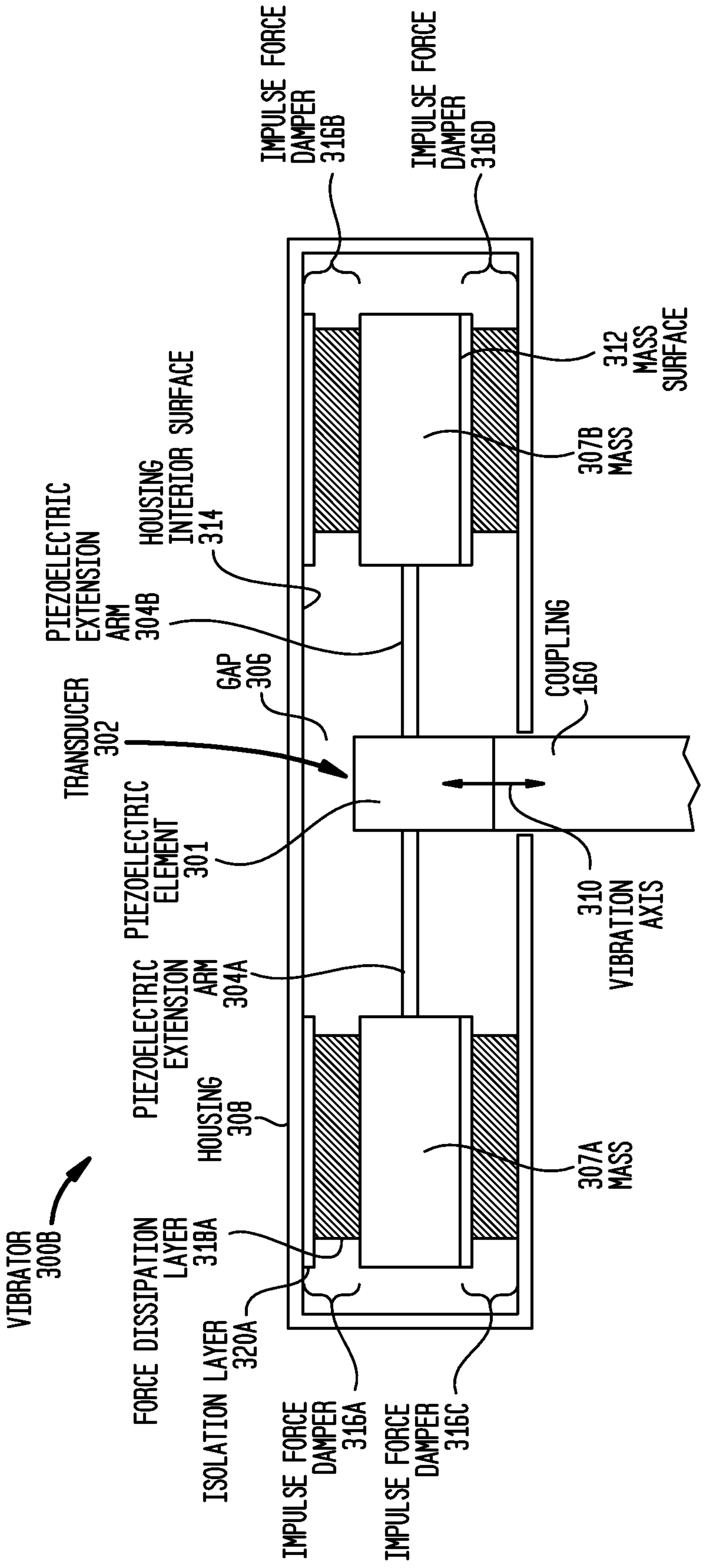
FIG. 3B depicts a vibrator having various multi-layer arrangements of impulse force dampers, in accordance with embodiments of the present technology.
Figure 3C:
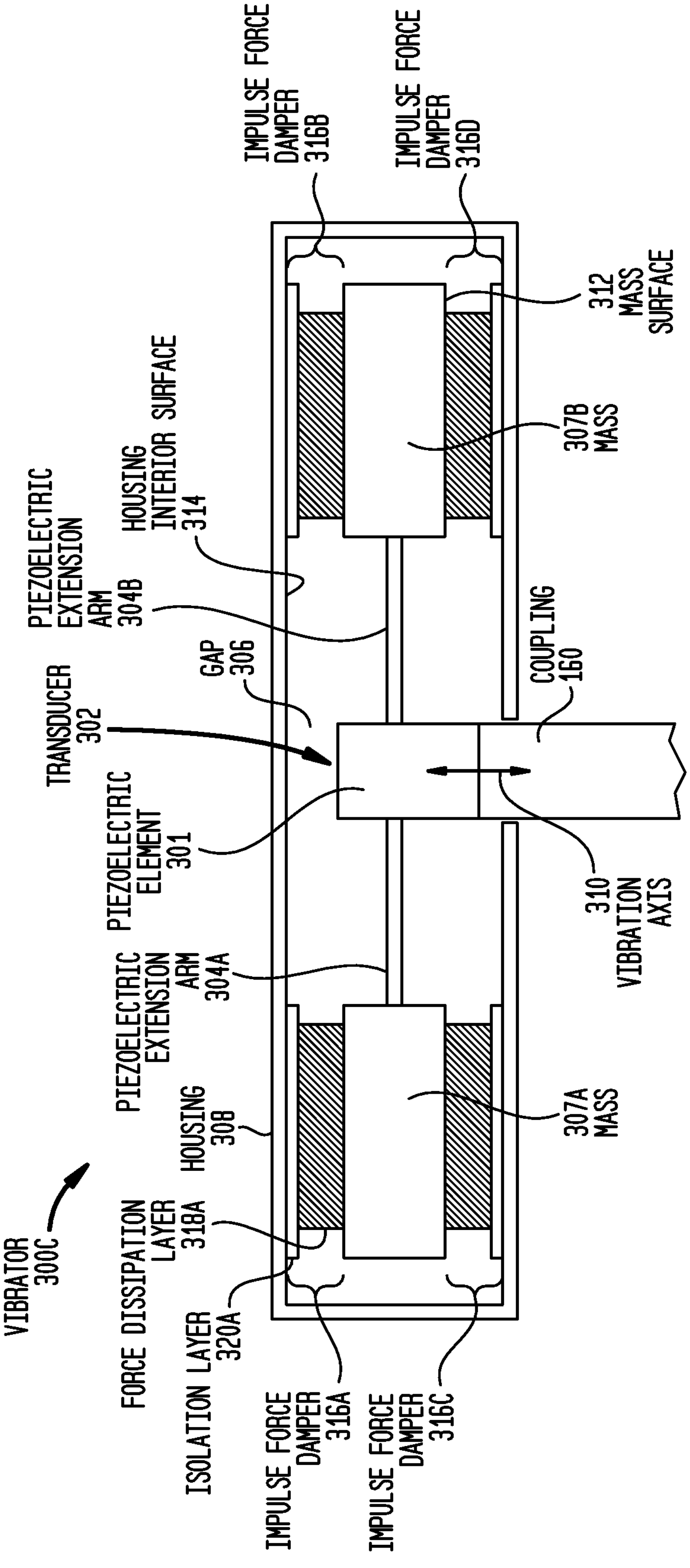
FIG. 3C depicts a vibrator having various multi-layer arrangements of impulse force dampers, in accordance with embodiments of the present technology.
Figure 3D:
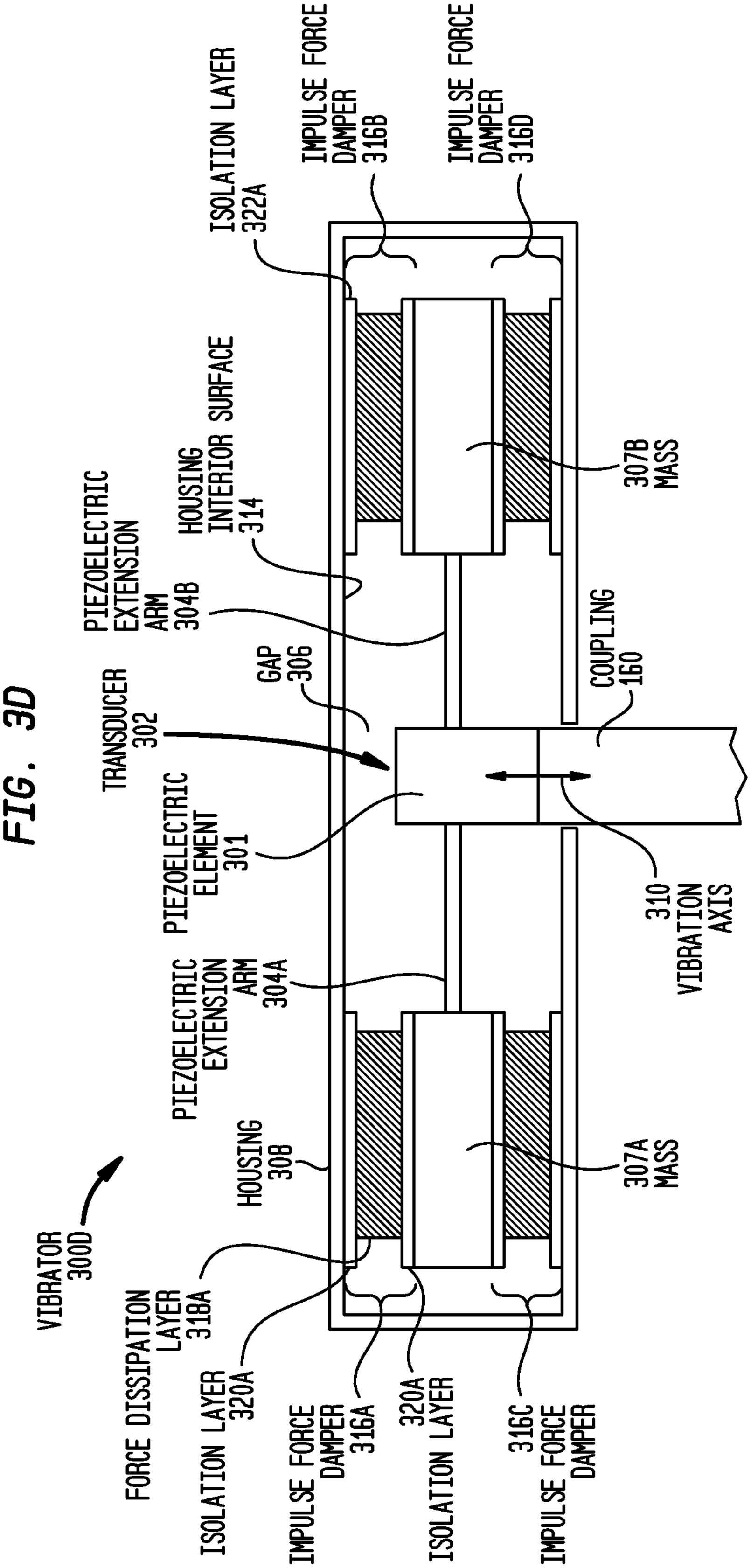
FIG. 3D depicts a vibrator having various multi-layer arrangements of impulse force dampers, in accordance with embodiments of the present technology.

As seen in FIGS. 3A-D, embodiments of impulse force dampers comprise varying arrangements of layers 320 and 318 in which isolation layer 320 is in contact with either housing surface 314 or transducer mass surface 312, and force dissipation layer 318 is in contact with the other surface. In certain embodiments, layers 320 and 318 are arranged and configured so that the layers substantially conform to manufacturing tolerances of a respective, abutting housing interior surface 314 and mass surface 312. In FIG. 3B, isolation layers 320A, 320B are applied to or interface with housing interior surfaces 314 and force dissipation layers 318A, 318B are applied to or interface with mass surfaces 312. Impulse force dampers 316C, 316D are configured as described above with reference to FIG. 3A. In FIG. 3C, all four impulse force dampers 316A-D are configured the same as impulse force dampers 316A, 316B of FIG. 3B. In FIG. 3D, impulse force dampers 316A-D each have two isolation layers 320 applied to or interfacing with housing interior surface 314 and mass surface 312, with the respective force dissipation layer 318 disposed between the two isolation layers.

According to embodiments, the vibrators shown in FIGS. 3A-D can be used in auditory prostheses, such as, but not limited to, active transcutaneous bone conduction devices. The vibrators 300A-D can be used for other bone conduction devices. For example, the vibrators shown in FIGS. 3A-D with an impulse force damper 316 comprising a force dissipation layer 318 and an isolation layer 320 can be used in other types of bone conduction devices in a similar manner to absorb impulse forces without substantially altering the frequency response of the vibrator. In certain embodiments such vibrators are configured for incorporation in bone conduction devices. For example, the vibrators described below with reference to FIGS. 3A-D can be implemented in transcutaneous bone conduction devices 100B and 100C, percutaneous bone conduction devices 100A, and in subcutaneous bone conduction devices.

Each layer of the exemplary impulse force dampers 316A-D are shown in FIGS. 3A-3D as having a rectangular shape. It should be understood that this is for ease of illustration, and that the shape of each layer depends on the material used, the properties of that material, and the manner in which the layers are applied.

Figure 4:
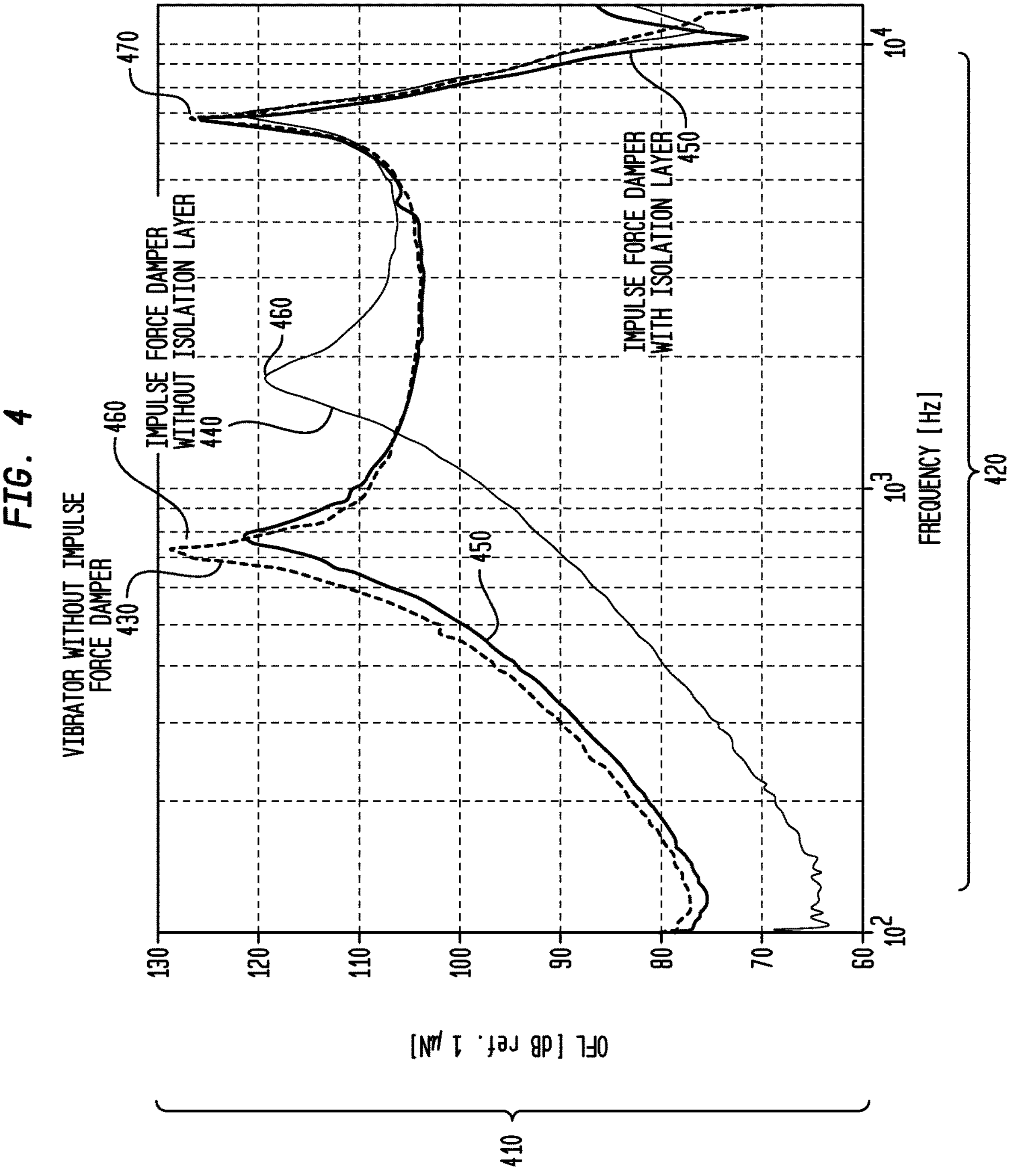
FIG. 4 is a graph illustrating the effects of using impulse force dampers in a auditory prostheses, in accordance with embodiments of the present technology.

FIG. 4 is a graph illustrating the operational performance of a vibrator implementing different embodiments of impulse force damper 216. Specifically, FIG. 4 illustrates the relationship between transducer output force level (OFL) 410 for a given operational frequency response 420 of the transducer. Because bone conduction devices deliver sound as vibrations in skull bone 136, FIG. 4 plots OFL 410 as a measure of vibration in relation to sound. A decibel (dB) in relation to 1 micronewton (μN) is a measure of the vibrational force produced by the device at different frequencies 420, which are expressed in Hertz (Hz).

Waveform 430 shows the OFLs across frequency range 420 for a vibrator of a transducer which does not implement an impulse force damper as described herein. Waveform 450 shows the OFLs across frequency range 420 for the same vibrator of the same transducer which implements an embodiment of the impulse force damper described herein. As shown in FIG. 4, at most frequencies 420 the OFL 410 of a vibrator implementing an impulse force damper is the same or substantially the same as the OFL of a vibrator which does not implement an impulse force damper. The similarity of waveforms 430 and 450 illustrates that the impulse force damper does not load the transducer, and provides sufficient mechanical isolation of the housing to prevent the housing from loading the transducer. The similarity of waveforms 430 and 450 shows that the impulse force damper with an isolation layer does not substantially affect the frequency response of the vibrator, and that the locations of the respective resonance peaks 460 and 470 are almost identical. FIG. 4 illustrates that the performance of the vibrator with and without the impulse force damper with the isolation layer is substantially similar. This is achieved in part because in a quiescent state, the impulse force damper with the isolation layer imposes substantially no static preload on the transducer. As shown in FIG. 4, the impulse force damper is configured such that it causes a substantially insignificant effect on the frequency response of the vibrator. This is utilitarian in at least some embodiments because the impulse force damper helps to absorb impulse forces without affecting performance, thus ensuring that a recipient receives the appropriate stimulation as designed.

More specifically, waveform 450 reflects a limited effect on OFL 410 at lower values of frequencies 420, including only slight damping (magnitude attenuation) and shifting of first resonance peak 460, and substantially no effect at higher frequencies 420, as evidenced by the lack of any amplitude change. In particular, frequency response curve 450 shows that the amplitude of first resonance peak 460 is slightly damped by about 2-3 dBs. Frequency response curve 450 also shows first resonance peak 460 for a vibrator with an impulse force damper comprising both layers is shifted upwards by around 100 Hz from approximately 700 Hz to approximately 800 Hz.

Waveform 440 shows the OFLs across frequency range 420 for a vibrator of a transducer which implements the force dissipation layer of the impulse force damper, and not the isolation layer. As shown in FIG. 4, waveform 440 is offset from waveform 430, resulting in the OFL of a vibrator implementing just the force dissipation layer being different than the OFL of a vibrator without an impulse force damper, at least for a substantial portion of frequency range 420. This altering of the OFL at certain frequencies is due to the load placed on the transducer by the housing due to the reduced mechanical isolation which would otherwise be provided by the absent isolation layer. The additional loading occurs because the housing and mass effectively become a single element due to contact with the dissipation layer, and move as a unitary mass. This added mass of the housing on the transducer significantly alters the performance of the transducer. This altered performance of the transducer is undesirable as it results in inappropriate stimulation signals being delivered to the recipient, which can have the undesirable effects of altering output quality or preventing a hearing percept from being generated.

With continued reference to FIG. 4, frequency response curve 440 of a vibrator having an impulse force damper as described herein, and lacking an isolation layer can exhibit a relatively large effect on OFL 410. As shown the first peak 460 of such a vibrator can be damped significantly (e.g., by more than 10 dBs) and can be shifted upwards or downwards by as much as +−2000 Hz. Such a large shift of first resonance peak 460 may cause a vibrator to exhibit harmonic distortion in excess of 400 Hz, making the vibrator unsuitable for incorporation into auditory prosthesis.

While various impulse force damper configurations and arrangements may adequately protect a vibratory actuator/transducer from shock forces, configurations affecting OFL 410 enough to shift resonance peaks 460 or 470 to different frequencies 420 may not be suitable for use in transducers for auditory prostheses. Relative to a quiescent state in which no damper is mounted vis-à-vis the transducer, a damper can be described as applying a preload to a transducer if the mounted damper has the effect of applying a static force (a bias force) to the transducer, however small the preload might be. For example, a layer of damping material injected in its uncured state into a gap between a mass (attached to a transducer) and the housing so as to fill the might preload the transducer if the damping material expands when it transitions into its cured state. As another example, a vibrator relying solely upon a mechanical element such as spring to dampen impulse forces may preload a transducer or a mass component to the extent that OFL 410 is unduly affected. Impulse force dampers that have a minimal, limited effect on a transducer's OFL 410 while also dissipating impulse forces so as to substantially isolate a transducer from the impulse force are more suitable for auditory prostheses such as bone conduction devices. Impulse force dampers configured to dissipate an impulse force via deformation thereof thereby preventing damage to transducer while also having minimal shifting or damping effects on resonance peaks 460 and 470 are suitable impulse-force-resistant transducers for incorporation in an auditory prosthesis. In contrast, impulse force dampers applying sufficient preload to a transducer or mass component affects OFL 410 in terms of the amplitudes of resonance peaks 460 or 470 being altered and/or resonance peaks 460 or 470 being shifted to different frequencies 420. Such alterations and shifts can make such impulse force dampers less desirable for use in bone conduction devices.

Figure 5:
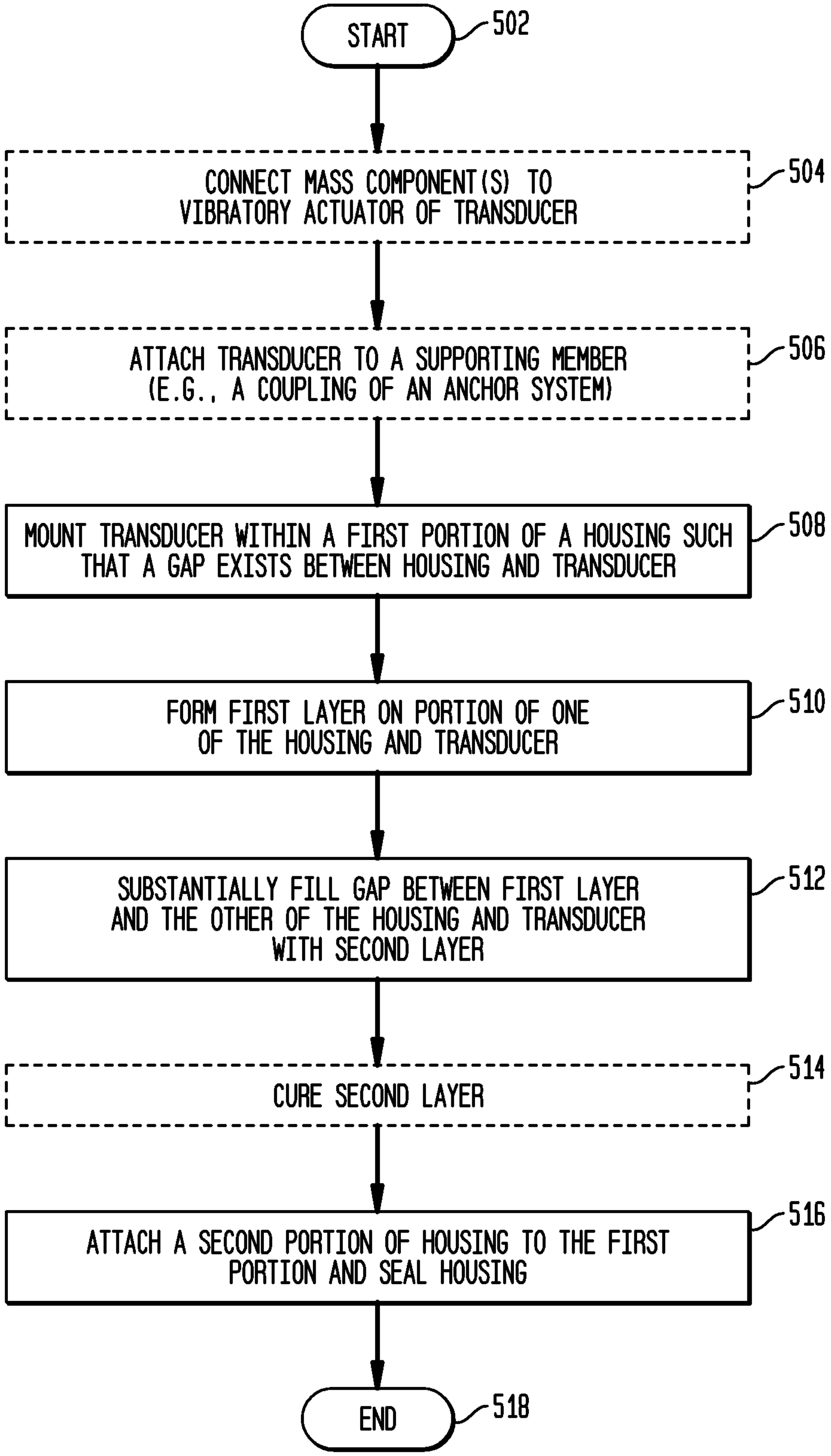
FIG. 5 is a flowchart depicting steps by which an impulse-force-resistant vibrator can be made, in accordance with embodiments of the present technology.

FIG. 5 is a flowchart depicting steps by which an impulse-force-resistant vibrator can be made. The flowchart depicted in FIG. 5 is described with reference to the embodiments described above. However, FIG. 5 is not limited to those example embodiments. The steps of methods for making impulse-force-resistant vibrator do not necessarily have to occur in the order shown in FIG. 5 and described below. According to embodiments, some of the steps shown in FIG. 5 are optional. Optional steps are indicated in the flowchart by dashed lines (see, e.g., steps 504, 506, and 514).

The method begins in step 502 when a vibrator including a transducer with preassembled mass components is provided. After the vibrator is provided, the method optionally proceeds to step 504 where the masses are connected to a vibratory actuator of the transducer, or alternatively to step 506 when no mass components are to be included. In optional step 504, one or more mass components are attached to a vibratory actuator. In certain embodiments this step comprises attaching a piezoelectric element to at least one mass component. By completing step 504, embodiments such as those described above can be implemented whereby the transducer comprises single or dual mass components attached to a piezoelectric actuator. In embodiments, step 504 can comprise connecting one or more mass components to piezoelectric elements.

After the mass components are connected to the vibratory actuator (if desired), the method optionally proceeds to step 506 where the transducer is attached to a supporting member, or alternatively to step 508 when the provided transducer is already attached or mounted to the supporting member. In embodiments, optional step 506 comprises mounting the transducer or actuator to a coupling of an anchor system such as those described above with reference to FIGS. 1A-1C. In an embodiment, step 506 can comprise attaching the transducer structure with its piezoelectric elements and mass components to the supporting member. After the transducer is optionally attached to a supporting member, flow proceeds to step 508. In step 508, the transducer provided in step 502 is suspended or mounted within a first portion of a housing so that gaps are between the juxtaposed transducer and surfaces of the first portion of the housing. In embodiments, step 506 comprises positioning the transducer such that there is a gap between internal surfaces of the first portion of the housing and the transducer. In an embodiment, step 508 can comprise mounting the transducer within a bottom portion of a housing so that gaps are between the transducer and the bottom portion of the housing.

In step 510, a first layer is formed on one of a surface of the housing and the transducer. Embodiments of this step can comprise depositing the first layer of the impulse force damper as an isolation layer via spray, sputter, or vapor deposition onto a region of one of the housing and the transducer. This step forms the first layer such that it substantially conforms to manufacturing tolerances of the surface to which it is applied. Embodiments such as those depicted herein can implemented by an alternative implementation of step 510 that forms dual isolation layers of the damper on surfaces of the housing and the transducer. Embodiments can include applying the first layer as a film, foil, or other suitable coating onto target surface(s) and region(s) of the housing and/or transducer. Regardless of the coating and application technique employed to implement step 510, the first layer substantially conforms to manufacturing tolerances of target surface(s) and region(s). It should be appreciated that step 510 may be performed prior to the assembly of the vibrator in the prior steps. In embodiments, step 510 comprises positioning the isolation layer on one of an internal surface of the housing and a surface of the mass component(s). In an alternative embodiment, step 510 comprises positioning the force dissipation layer on one of an internal surface of the housing and a surface of the mass component(s). This step can comprise injecting one of the force dissipation layer or the isolation layer through opening (s) in the mass component(s) onto an interior surface of the bottom portion of the housing. In additional or alternative embodiments, step 510 can comprise forming one of the force dissipation layer or the isolation layer directly onto a surface the mass component(s). After the first layer is formed, flow proceeds to step 512.

In step 512, the remainder of the gap between the first layer and an opposing surface of the other of the housing or the transducer are substantially filled with a second layer of the impulse damper. In an embodiment, when step 510 placed the force dissipation layer on the mass component(s), step 512 comprises positioning the isolation layer on the force dissipation layer. According to embodiments, step 512 can comprise injecting a shock absorbing elastic material such as, but not limited to, an uncured or semi-cured gel into an opening in the transducer, such as, for example, via ducts in the mass component(s). This step can comprise injecting one of the force dissipation layer or the isolation layer through opening(s) in the mass component(s) into the remainder of the gap between an interior surface of the bottom portion of the housing and the mass component(s). For example, step 512 can comprise injecting an uncured or semi-cured elastic silicone gel into a gap corresponding to the region via opening(s) and/or duct(s) in the transducer. In certain embodiments the openings and/or ducts have diameters of approximately 1.2 mm. This step can comprise flowing the second layer onto the opposing surface of the other of the housing or the transducer such that the second layer conforms to manufacturing tolerances of the surface. After the gap is substantially filled, flow optionally proceeds to step 514 when an uncured or semi-cured material is used.

In optional step 514, any uncured or semi-cured material used for the second layer in step 512 is cured as needed and then flow proceeds to step 516. After curing in step 514, the impulse force damper exhibits sufficient elastic properties (i.e., elasticity) so as to dissipate an impulse force via deformation thereof thereby substantially isolating a vibratory actuator/transducer from the impulse force.

In step 516, a second portion of housing is attached to the first portion of the housing from step 508 and the housing is sealed. In certain embodiments, step 516 can comprise sealing opening(s) and/or duct(s) in the transducer, such as the opening(s) or duct(s) used in step 512. After the housing is sealed, flow proceeds to step 518 where the method ends.

The present technology described and claimed herein is not to be limited in scope by the specific example embodiments herein disclosed, since these embodiments are intended as illustrations, and not limitations, of several aspects of the present technology. Any equivalent embodiments are intended to be within the scope of the present technology. Indeed, various modifications of the present technology in addition to those shown and described herein will become apparent to those skilled in the art from the foregoing description. For example, the present technology has been described in the context of a medical device, and specifically in the context of a moving component of an auditory prosthesis. It should be appreciated that the impulse force damper described herein may be implemented in any device in which a component may be damaged due to impulse forces. Such modifications are also intended to fall within the scope of the appended claims.

The invention claimed is:

1. A vibrator comprising:
a housing;
a piezoelectric transducer positioned within the housing such that there is a gap between the transducer and housing; and
an impulse force damper, disposed in the gap between the housing and at least a portion of the transducer, configured to mechanically isolate at least a first portion of the transducer and the housing, and to minimize impulse forces applied to the transducer relative to that which would be the case in the absence of the impulse force damper.

2. The vibrator of claim 1,
wherein for at least one of a plurality of regions of the gap between the housing and the at least a portion of the transducer, the impulse force damper substantially fills the gap in that at least one region, and
wherein said impulse force damper is configured to minimize adhesion between abutting surfaces of at least one of the damper/housing interface and the damper/transducer interface.

3. The vibrator of claim 1, wherein said damper is formed of an elastic damping material completely isolated from at least one of the housing or the first portion of the transducer at least when the transducer is in a non-energized steady state.

4. The vibrator of claim 1, wherein the damper comprises:
a first layer of a first material in contact with one of either the housing or the transducer; and
a second layer of a second material in contact with at least the first layer and interposed between the first layer and the other of either the housing or the transducer, wherein the first and second layers have abutting surfaces defining a first layer/second layer interface,
wherein the first and second materials are antifriction materials with respect to each other.

5. The vibrator of claim 1, wherein:
the vibrator is configured to operate in an indistinguishable manner in the absence of all impulse force damper component(s) and in the presence of the impulse force damper components.

6. The vibrator of claim 1, wherein:
a second portion of the transducer that is integral with the first portion is rigidly supported within the housing.

7. The vibrator of claim 1, wherein:
the housing is a completely separate component from the entirety of the transducer; and
the vibrator is coupled to a recipient.

8. The vibrator of claim 1, wherein:
the vibrator includes a first mass and a second mass separate and discrete from the first mass; and
the first mass is located at a first end of the piezoelectric transducer and the second mass is located at a second end of the piezoelectric transducer opposite the first end and completely away from the first mass, the first end and the second end being located normal to a thickness of the piezoelectric transducer, and
the vibrator is part of a bone conduction device.

9. The vibrator of claim 1, wherein:
a support supports the piezoelectric transducer within the housing;
the vibrator includes a first mass and a second mass separate and discrete from the first mass; and
the first mass and the second mass are supported by the piezoelectric transducer at opposite ends of the piezoelectric transducer entirely away from the support; and
the vibrator is part of a hearing prosthesis.

10. A bone conduction apparatus, comprising:
the vibrator of claim 1; and
a microphone.

11. The vibrator of claim 1, further comprising:
a second impulse force damper;
a third impulse force damper;
a fourth impulse force damper; and
the four impulse force dampers are respective discrete separate components being spaced away from each other, two of the impulse force dampers being located above the piezoelectric transducer and two of the discrete components being located below the piezoelectric transducer, two of the impulse force dampers being located on one side of a longitudinal axis of the vibrator and two of the impulse force dampers being located on an opposite side of the longitudinal axis of the vibrator, and the vibrator is a means for creating vibration.

12. A bone conduction device, comprising:
a mass;
an actuator configured to move the mass to generate vibrations to evoke a hearing percept; and
a housing encompassing the mass and the actuator, wherein
a damper is located in a space between a housing wall of the housing and the mass.

13. The bone conduction device of claim 12, wherein:
the housing is a completely separate component from all component(s) making up the actuator.

14. The bone conduction device of claim 12, wherein:
the mass is separate from the actuator and the actuator is configured so as to still actuate if the mass was absent.

15. The bone conduction device of claim 14, wherein:
the damper includes a damper material and an isolation layer that separates the damper material from one of the mass and the housing wall.

16. The bone conduction device of claim 14, wherein:
the damper is a first damper;
the bone conduction device includes a second damper located in a second space between another portion of the housing and another side of the mass on an opposite side of the mass from the first damper.

17. The bone conduction device of claim 14, wherein:
the device is configured such that during actuation of the actuator, the mass moves relative to the housing while a portion of the actuator supporting the mass moves by a lesser amount relative to the housing.

18. The bone conduction device of claim 12, wherein:
the housing includes a portion that makes up a part of the actuator.

19. The bone conduction device of claim 12, wherein:
the actuator is a piezoelectric actuator.

20. The bone conduction device of claim 12, wherein:
the actuator is established by components completely separate from the damper.

21. The bone conduction device of claim 12, wherein:
the housing establishes a hermetically sealed volume containing the actuator.

22. The bone conduction device of claim 12, wherein:
the actuator is a piezoelectric actuator;
the bone conduction device includes a plurality of masses, including a first mass corresponding to the mass, and a second mass corresponding to a second mass separate from the first mass, the first mass and the second mass being located normal to a thickness of the piezoelectric transducer, and
the first mass is located at a first end of the piezoelectric actuator and the second mass is located at a second end of the piezoelectric actuator opposite the first end.

23. A method of damping an impulse force to which a vibrator for an auditory prosthesis is susceptible, the vibrator including a housing, a transducer mounted in the housing and a multilayer damper disposed between the housing and the transducer, the method comprising:
compressing the damper in response to the impulse force, the compressing including:
deforming at least one layer of the damper so as to dissipate energy of the impulse force; and
moving one or more of:
at least one other layer of the damper with respect to the housing; or
at least one other layer of the damper with respect to the transducer.

24. The method of claim 23, further comprising:
imposing, in a quiescent state, substantially no static preload on the transducer by the damper.

25. The method of claim 23, wherein the damper is configured to cause a substantially insignificant effect on the frequency response of the vibrator.

26. The method of claim 23, wherein:
the action of moving is due to there being substantially no adhesion between the one or more of:
two layers of the damper with respect to each other;
the at least one other layer of the damper with respect to the housing; and
the at least one other layer of the damper with respect to the transducer.

27. A method of damping an impulse force to which a vibrator for an auditory prosthesis is susceptible, the vibrator including a housing, a piezoelectric transducer mounted in the housing, a mass that moves with movement of the transducer relative to the housing and is supported by the piezoelectric transducer and spaced away from the housing, and a damper substance disposed between the housing and the mass, the method comprising:
displacing the damper substance in response to the impulse force due to movement of the mass as a result of the impulse force, the displacing including:

displacing the damper so as to dissipate energy of the impulse force; and slipping one or more of:

at least some of the damper substance with respect to the mass; or at least some of the damper substance with respect to the transducer.

28. The method of claim 27, wherein:

the mass is prevented from contacting the housing during the impulse force and a bending of the piezoelectric transducer is limited during the impulse force as a result of the structural configuration of the vibrator; and the method further includes operating the vibrator during normal operation in the absence of the impulse force so that the piezoelectric transducer bends, but not as much as the piezoelectric transducer bends during the impulse force.

29. The method of claim 27, wherein the damper is configured to avoid effecting the frequency response of the vibrator.

30. The method of claim 28, wherein:

the action of slipping is due to there being substantially no adhesion between the one or more of:

at least some of the damper substance with respect to the mass; or at least some of the damper substance with respect to the transducer.

31. The method of claim 27, wherein the method further comprises:

operating the vibrator during normal operation in the absence of the impulse force such that the actions of slipping one or more of at least some of the damper substance with respect to the mass or at least some of the damper substance with respect to the transducer also occur with less magnitude than that which occurs in the presence of the impulse force.

32. The method of claim 27, wherein:

the mass is prevented from contacting the housing during the impulse force as a result of the structural configuration of the vibrator.

33. The method of claim 27, wherein:

the mass is prevented from contacting the housing during the impulse force and a bending of the piezoelectric transducer is limited during the impulse force as a result of the structural configuration of the vibrator.

* * * * *